G. H. CURTISS.
LUBRICATING SYSTEM FOR TRAVELING MOTORS.
APPLICATION FILED DEC. 11, 1914.
1,329,038.
Patented Jan. 27, 1920.
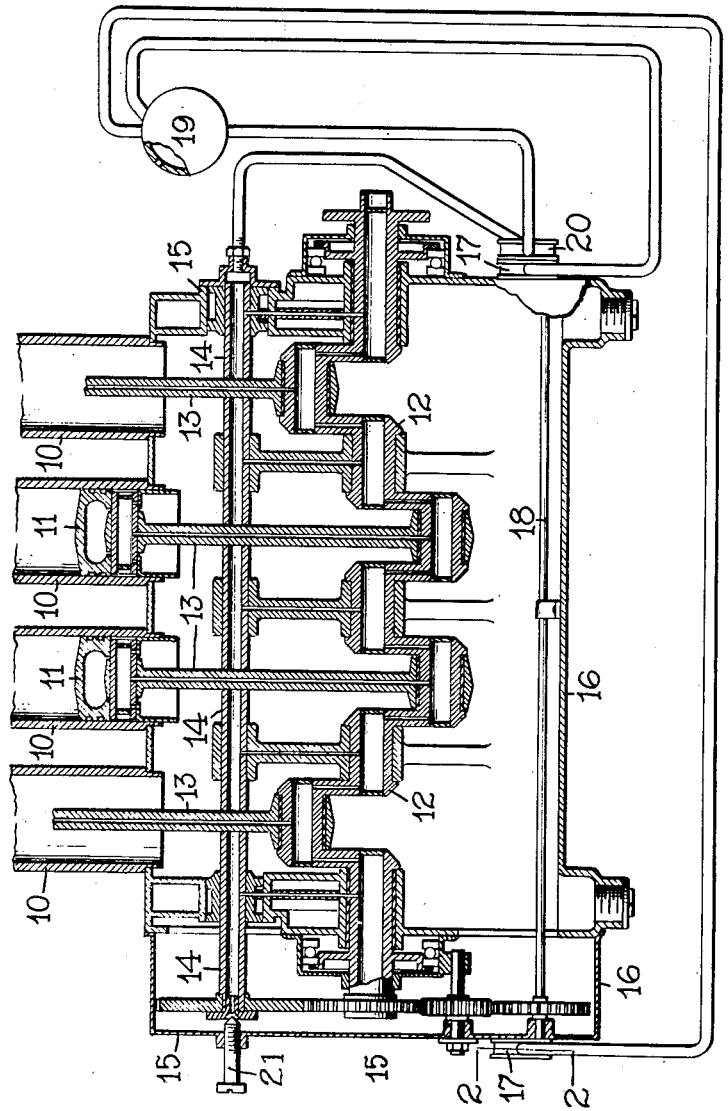
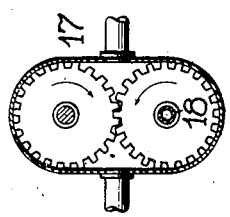
Inventor
GLENN H. CURTISS.

UNITED STATES PATENT OFFICE.

GLENN H. CURTISS, OF HAMMONDSPORT, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

LUBRICATING SYSTEM FOR TRAVELING MOTORS.

1,329,038.  Specification of Letters Patent.  Patented Jan. 27, 1920.

Application filed December 11, 1914. Serial No. 876,716.

*To all whom it may concern:*

Be it known that I, GLENN H. CURTISS, a citizen of the United States, residing at Hammondsport, in the county of Steuben and State of New York, have invented certain new and useful Improvements in Lubricating Systems for Traveling Motors, of which the following is a specification.

My invention relates to motors and particularly to motors employed in aircraft.

Difficulties have heretofore been experienced in the lubrication and operation of aircraft motors, especially motors used on aircraft of the heavier than air type, due to the unusually severe conditions of service to which aeroplane motors are subjected. The object of my invention is to minimize these difficulties and I accomplish this by the provision of a lubricating system such that, regardless of the positions assumed by the craft in practice, and regardless of the severe conditions of service, an ample quantity of lubricant may be supplied at all times to the moving parts of the motor, and the motor is neither under-lubricated, over-lubricated or flooded at any time. The operation of the motor is thereby rendered more certain and reliable, and the craft as a whole thereby rendered more safe and secure.

In brief, in its broad aspect my invention comprises a drainage reservoir in fixed position upon the aircraft for receiving oil from different parts of the motor and the position of the oil in which shifts from one portion thereof to another as the inclination changes during the travel, and means whereby the oil is drawn or pumped from said reservoir during and regardless of said inclination changes. More specifically speaking my invention comprises a crank case drainage receptacle arranged to receive the oil draining from the lubricated bearings, and the oil in which shifts from one end to another as the inclination of the motor is changed in travel, a pair of circulating pumps, one drawing its supply from one end of said drainage receptacle and one from the other, an elevated supply reservoir fed by said circulating pumps, and an additional force feed pump passing oil from said supply reservoir to the bearings of the motor. My invention includes details of the conduit system and the regulation of the forced feed pressure as well.

In the accompanying drawings I show that form of my invention now best known to me.

Figure 1 is a diagrammatic illustration of the system, and

Fig. 2 is a sectional view of one of the pumps.

The parts may be identified by the reference numerals with which they are designated upon the drawings, and are characterized individually as now set forth.

(10, 10) The cylinders of an internal combustion motor. The motors usually installed upon aircraft are of this character, but as respects my invention, the motor may be of any other character, operated by one source of power or another, and may be of the reciprocating or the rotary type.

(11) The pistons of this motor.
(12) The crank shaft.
(13) The connecting rods.
(14) The cam shaft. Both the crank shaft and the cam shaft are hollowed out to form conduits through which oil may pass to the crank, connecting rod, and cam shaft bearings. The branches from the crank bearing conduits extend through the bearings, and through the connecting rods 12, to the piston pins which are likewise hollowed out, and deliver oil through restricted apertures to the walls of the cylinders themselves. The details of these apertures and the plugging up of the ends of the several hollow shafts and pins to properly confine the oil to the conduit system so formed, constitute no part of my present invention, the claims of this application being directed more especially to the system of lubrication set forth.

(15) The motor casing inclosing the main moving parts.

(16) The crank case drainage receptacle arranged longitudinally of the motor to receive the oil draining from the lubricated parts. This receptacle is really in continuation of the casing 15 being suitably connected thereto in any well known manner.

(17, 17) A pair of circulating pumps located one at each end of the drainage receptacle 16 and drawing its supply therefrom. These pumps are preferably of the gear pump type as indicated in Fig. 2, but they may be of any other type.

(18) A drive shaft for the pumps located at the bottom of the receptacle 16 and extending longitudinally thereof, the drive gears of pumps 17 being mounted on opposite ends of this shaft. Preferably this shaft is of tubular form to secure maximum lightness.

(19) An elevated supply reservoir into which the circulating or scavenging pumps 17 deliver the oil which they draw from receptacle 16. This supply reservoir is preferably at a level from which the oil may feed by gravity to the various parts of the motor to be lubricated.

(20) An additional circulating pump also driven from shaft 18 and located alongside of one of the pumps 17. This pump takes oil directly from the supply reservoir 19 and delivers it to one end of the hollowed out cam shaft 14. This delivery is made through the inclosing casing 15 of the end bearing, whereby as clearly indicated the bearing itself serves as stuffing box for the connection with the rotating shaft 14.

(21) A throttle valve associated directly with the open opposite end of cam shaft 14. The seat of this valve is formed by a bushing secured in the open end of the shaft and rotating therewith, the valve opening of the seat being concentric. The stem of the valve is threaded through casing 15, and provided with a suitable jam nut for holding it in adjusted positions.

The operation of the system will be readily understood from the description already given. As the inclination of the traveling motor is changed, the bulk of the oil draining from the lubricated parts runs first to one end of the receptacle 16 and then to the other. No matter which end the oil occupies, there is a circulating pump 17 which draws it out and delivers it to the main supply reservoir 19. Under normal conditions both of these pumps are pumping oil. The fact that one of the pumps may deliver air to the supply reservoir is of no moment, since this reservoir is as usual provided a suitable air vent. The additional circulating pump 20 is constantly forcing oil from the supply reservoir 19 through the bearings of the motor to properly lubricate the same. Inasmuch as the reservoir 19 is a main supply reservoir and not a drainage reservoir it may be placed transversely of the plane of inclination of the motor under varying conditions, and the supply of lubricant is therefore seldom if ever interrupted by shifting the body of lubricant in the reservoir. The pressure of the forced feed is determined by the throttle valve 21, and it will be observed that the discharge through this valve is inside of the casing 14 whereby it drains directly into the crank case receptacle 16, thereby obviating the necessity for any special bypass conduit and the necessity for making joints therefrom to the casing or to any conduit or pump.

Particular attention is directed to the specific location of the pump 17. An aeronautical motor, in use, often assumes a substantially vertical position and as a consequence the oil contents of the drainage reservoir must gravitate to the lower end of the motor. By utilizing the dual pump system and arranging the pumps as specified at the opposite terminals of the drainage reservoir, the lubricant under all circumstances is fed to the supply reservoir 19. Each pump 17 is preferably of a pumping capacity sufficient to scavenge the drainage reservoir and accordingly preclude the accumulation of lubricant therein. The accumulation of oil in the drainage reservoir is undesirable in motors of the aeronautical type in view of the unusual positions necessarily assumed by the motor while in use, since such accumulation often results in flooding the cylinders and stalling the motors. No back flow of lubricant is possible from the reservoir 19 to the drainage reservoir and flooding is therefore avoided even in the upside down position. It will also be observed that the pumps 17 are located in the approximate plane of the drainage reservoir and in such proximity to the terminals thereof as to insure the required pumping action without regard to the angle of inclination of the motor. The pump 20 is preferably of a lesser pumping capacity than that of the pump 17 although it may be, if desired, of equal pumping capacity, but never greater.

It will be readily understood by those skilled in the art after understanding my invention that as many pumps 17 associated with as many different portions of receptacle 16 may be provided as desired, and at different elevations, so that the motor may be adapted for travel at any inclination whatsoever, on end or even up side down.

What I claim is:

1. A lubricating system for aeronautical motors, comprising an oil reservoir, feeding means supplying oil to the motor, an oil drainage reservoir, and a plurality of scavenging pumps establishing communications between said reservoirs and arranged to either independently or collectively return oil from said drainage reservoir to the supply reservoir according to the position of the motor, said supply reservoirs being otherwise closed to said drainage reservoir for the purpose set forth.

2. A lubricating system for aeronautical motors, comprising a drainage reservoir arranged to receive oil draining from the various parts of the motor, and a plurality of pumps adapted each independently to elevate oil from said drainage reservoir to a level from which it may pass again to the various parts of said motor to be lubricated, at least one of said pumps being effective regardless of the angle of inclination of the motor, said pumps forming the sole outlets for lubricant from said reservoir.

3. A lubricating system for aeronautical motors comprising a drainage reservoir adapted to receive oil draining from the moving parts of the motor, a supply reservoir closed to said drainage reservoir except through a pair of outlets leading from different points of said drainage reservoir and spaced along the longitudinal axis of the motor, and a pair of scavenging pumps associated respectively with said outlets for withdrawing the used lubricant from said drainage reservoir and forcing the same into said supply reservoir.

4. A lubricating system for aeronautical motors, comprising a drainage reservoir arranged longitudinally of the motor and adapted to receive oil draining from the moving parts of the motor, said reservoir having a single pair of outlets for the lubricant contained therein, said outlets being distributed longitudinally of the motor, and a pair of circulating pumps, one of said pumps drawing its supply from one of said outlets and the other from the other of said outlets.

5. A lubricating system for the motors of aircraft comprising a drainage reservoir arranged longitudinally of the motor, a pair of circulating pumps, one of said pumps drawing its supply from one end of said reservoir and the other from the other end thereof and a supply reservoir adapted to receive oil from said drainage reservoir, said supply reservoir being in communication with said drainage reservoir solely through said circulating pumps.

6. A lubricating system for traveling motors, comprising a drainage reservoir arranged longitudinally below the motor, a drive shaft extending longitudinally of said drainage reservoir at the bottom thereof, and a pair of circulating pumps located one on each end of said drive shaft and each drawing its supply from the corresponding end of said reservoir.

7. A lubricating system for traveling motors, comprising a drainage reservoir arranged longitudinally below the motor, a drive shaft extending longitudinally of said drainage reservoir at the bottom thereof, and a pair of circulating pumps located one on each end of said drive shaft and each drawing its supply from the corresponding end of said reservoir, together with an elevated supply reservoir fed directly by the aforesaid pair of pumps and a third circulating pump drawing its supply from said supply reservoir and directly feeding the bearings of the motor.

8. A lubricating system for aeronautical motors comprising a supply reservoir, a drainage receptacle arranged to receive the oil draining from the lubricated parts, said drainage receptacle having communication with said supply reservoir through a plurality of outlets, a plurality of circulating pumps one for each of said outlets, scavenging said drainage receptacle and delivering the contents thereof to said supply reservoir, and an additional circulating pump feeding oil from said supply reservoir to the bearings of the motor.

9. A lubricating system for traveling motors, comprising a hollowed out shaft serving as a distributing conduit, a force pump feeding to the interior of said shaft, and a throttle valve associated directly with said shaft to regulate the pressure of the forced feed.

10. A lubricating system for traveling motors, comprising a hollowed out shaft of the motor serving as a distributing conduit, a force pump feeding oil directly to one end of said shaft through the casing of a bearing inclosing the end thereof, and a throttle valve directly associated with the opposite end of said shaft whereby the pressure of the forced feed may be regulated.

11. A lubricating system for inclosed motors comprising a hollowed out motor shaft serving as a distributing conduit, a motor casing terminating in an oil reservoir, a force pump feeding oil to the interior of said shaft, and a throttle valve directly associated with said shaft and operable from without the casing.

12. A lubricating system for motors comprising an inclosing casing terminating in an oil reservoir, a force feed supply system through which oil is delivered under pressure to the incased parts of said motor, and an adjustable feed pressure regulating device located on the inside of said casing but operable freely from a point without the casing.

13. A lubricating system for aeronautical motors comprising a drainage reservoir arranged to receive lubricant draining from various parts of the motor, and having distributing outlets through which the used lubricant may be scavenged, and a scavenging and feeding system so arranged with respect to each of said outlets and forming a part of the lubricating system as to withdraw the lubricant from said drainage reservoir regardless of the angle of inclination of the motor.

14. A lubricating system for aeronautical motors comprising a supply reservoir, feeding means supplying oil to the motor from said reservoir, an oil drainage reservoir having a plurality of outlets, and a plurality of scavenging pumps one for each outlet located in the approximate horizontal plane of the longitudinal axis of said drainage reservoir independently returning oil therefrom to said supply reservoir.

15. A lubricating system for aeronautical motors comprising a drainage reservoir arranged to receive oil draining from the various parts of the motor and having two outlet openings formed therein, and a scavenging and feeding system so arranged with respect to each of said outlets and forming a part of the lubricating system as to withdraw from the reservoir, via said outlet openings formed therein at opposite ends thereof, the drained lubricant, regardless of the angle of inclination of the motor.

16. A lubricating system for aeronautical motors comprising a drainage reservoir arranged to receive oil draining from the various parts of the motor and having a plurality of outlet openings, and a plurality of pumps one for each of said openings mounted in the approximate horizontal plane of the longitudinal axis of said reservoir adapted each independently to elevate oil therefrom to a level from whence it may be again distributed to the various parts of said motor requiring lubrication.

17. A lubricating system for motors including a distributing conduit located interiorly of the motor crank case into which the oil is forcibly fed, a means to forcibly feed the lubricant to said conduit, and pressure regulating means associated with and mounted at one end of said conduit to extend without the crank case.

18. A lubricating system for traveling motors comprising a hollowed out shaft serving as a distributing conduit, a means forcibly feeding the lubricant to the interior of said shaft, and a means associated directly with said shaft and extended without the crank case of the motor to regulate pressure of the forced feed.

19. A lubricating system for aeronautical motors comprising a drainage reservoir arranged to receive oil draining from the various parts of the motor and having a plurality of outlet openings, and independently acting pumps one for each opening located at opposite ends of the reservoir to withdraw oil therefrom regardless of the angle of inclination of the motor for subsequent distribution to various parts of said motor requiring lubrication.

20. A lubricating system for traveling motors comprising a drainage reservoir arranged to receive oil draining from various parts of the motor, a distributing conduit, a means directing oil under pressure to and through the conduit, a by-pass leading from the conduit and discharging again into the reservoir, and a means located at the juncture of the by-pass and the conduit to regulate the pressure of the forced feed.

21. A lubricating system for traveling motors comprising a drainage reservoir arranged to receive oil draining from various parts of the motor, a distributing conduit, a means to forcibly feed the lubricant to said conduit, a by-pass leading from the conduit to the reservoir wholly within the crank case of the motor and a means located at the juncture of the by-pass and the conduit and extended without the crank case to regulate the pressure of the forced feed.

22. A lubricating system for traveling motors comprising a drainage reservoir arranged to receive oil draining from the various parts of the motor, a means operable regardless of the angle of inclination of the motor to continuously withdraw oil from said drainage reservoir for subsequent distribution to the various parts of said motor requiring lubrication, said drainage reservoir being closed except through said scavenging means.

23. A lubricating system for motors including a reservoir located wholly within the crank case of the motor, and distributing conduit located wholly interiorly of the motor, a means to forcibly feed the lubricant to said conduit, a by-pass leading from the conduit to the reservoir and located wholly within the crank case of the motor, and means directly associated with said by-pass and extended without the crank case to regulate pressure of the forced feed.

24. A lubricating system for aeronautical motors comprising a drainage reservoir arranged to receive oil draining from the various parts of the motor and having two outlet openings therein, and a means associated with each of said openings operable regardless of the angle of inclination of the motor to continuously withdraw oil from said drainage reservoir for subsequent distribution to such parts of the motor as require lubrication.

25. A lubricating system for aeronautical motors comprising a drainage reservoir arranged to receive oil draining from the various parts of the motor and having a plurality of outlet openings therein, and a means associated with each of said openings which is operable regardless of the angle of inclination of the motor to continuously withdraw oil from said drainage reservoir for re-circulation throughout the motor parts requiring lubrication.

26. A lubricating system for aeronautical motors comprising a drainage reservoir terminally equipped with outlet openings and means operable to withdraw lubricant from said reservoir via at least one of said openings regardless of the angle of inclination of the motor.

27. A lubricating system for aeronautical motors comprising a drainage reservoir arranged to receive oil draining from the various parts of the motor, a supply reservoir from which the lubricant is adapted to be delivered to the motor parts, a single communicating duct disposed between either end of the drainage reservoir and the supply reservoir, and a force pump disposed in each communicating duct for continually withdrawing the oil from the drainage reservoir and supplying the same to said supply reservoir.

28. A lubricating system for aeronautical motors comprising a drainage reservoir extending longitudinally of the motor, a supply reservoir from which oil is adapted to be delivered to the motor parts, said supply reservoir being in communication with either end of said drainage reservoir, and a force pump located in each of the communicating passages for scavenging the oil from the drainage reservoir regardless of the angle of inclination of the motor.

29. A lubricating system for aeronautical motors comprising a drainage reservoir extending longitudinally of the motor and arranged to receive oil draining from the various parts of the motor, a supply reservoir from which the oil is adapted to be delivered to the motor parts, a pair of communicating ducts disposed between said supply reservoir and the ends of said drainage reservoir, said ducts being distributed longitudinally of the motor and forming the sole means of communication between said reservoirs and a force pump located in each duct for returning the used oil from either end of the drainage reservoir regardless of the angle of inclination of the motor.

30. A lubricating system for aeronautical motors comprising a drainage reservoir disposed below and longitudinally of the motor, said reservoir having a single outlet opening at either end thereof, said openings forming the sole outlets for lubricant from said reservoir, a supply reservoir from which oil is adapted to be delivered to the motor parts and means operable to withdraw lubricant from said drainage reservoir via at least one of said openings regardless of the angle of inclination of the motor.

31. A lubricating system for aeronautical motors comprising a drainage reservoir disposed below the motor and having outlet openings at either end thereof, a supply reservoir from which oil is adapted to be delivered to the motor parts, said supply reservoir being in communication with said drainage reservoir solely through said outlet openings and a pump for withdrawing lubricant from said drainage reservoir via at least one of said openings regardless of the flying position of the aeroplane with reference to the horizontal.

32. A lubricating system for aeronautical motors comprising a drainage reservoir disposed below and extending longitudinally of the motor, a supply reservoir from which oil is adapted to be delivered to the motor parts, a single communicating duct disposed between either end of the drainage reservoir and the supply reservoir and means for forcing lubricant from the drainage reservoir to the supply reservoir via said communicating passages regardless of the angle of inclination of the motor.

33. A lubricating system for aeronautical motors comprising a drainage reservoir disposed below the motor and arranged to receive oil draining from the various parts of the motor, a supply reservoir from which oil is adapted to be delivered to the motor parts, a communicating duct leading from either end of said drainage reservoir to said supply reservoir, said ducts being the sole means of communication between said reservoirs, and means for withdrawing the used lubricant from the ends of said drainage reservoir through said communicating ducts and supplying the same to said supply reservoir and for preventing the return of the lubricant from the supply reservoir to the drainage reservoir.

34. A lubricating system for aeronautical motors comprising a drainage reservoir arranged longitudinally of and below the motor, a pair of circulating pumps located one on each end of said drainage reservoir and each adapted to draw its supply from the corresponding end of said reservoir and means within said reservoir for driving said circulating pumps in unison.

35. A lubricating system for aeronautical motors comprising a drainage reservoir arranged longitudinally of and below the motor, a driving shaft extending longitudinally of said drainage reservoir at the bottom thereof and a pair of circulating pumps located one on each end of said driving shaft and each drawing its supply from the corresponding end of said reservoir, and a supply reservoir which receives lubricant from said pumps and supplies lubricant to the motor parts.

36. In an internal combustion engine, a lubricating system therefor comprising a drainage receptacle adapted to receive oil dripping down from the moving parts of the motor, a supply reservoir from which oil is adapted to be supplied to the moving parts of the motor, communicating passages between said receptacle and said reservoir, and means within all of said passages preventing the direct return of oil from said reservoir to said receptacle but permitting the passage therethrough of used lubricant from the receptacle to said reservoir for the purpose set forth.

37. In a motor, the combination of an oil supply reservoir, a drainage receptacle arranged to receive the oil draining from the motor parts, said drainage receptacle permitting free and unobstructed flow therein of the used lubricant in the fore and aft direction and from one end to the other, said drainage receptacle having a pair of longitudinally distributed scavenging outlets leading to said supply reservoir, a scavenging system associated with said reservoir and said receptacle and adapted to withdraw the used lubricant through at least one of said outlets and supply the same to said supply reservoir at all ordinary angles of inclination assumed by the motor in practice, said scavenging system comprising means preventing any substantial backflow of lubricant from said supply reservoir to said drainage receptacle, and means for feeding oil from said supply reservoir to the motor bearings.

38. In a motor, the combination of an oil supply reservoir, a drainage receptacle arranged to receive the oil draining from the motor parts, said drainage receptacle permitting free and unobstructed flow therein of the used lubricant in the fore and aft direction and from one end to the other, said drainage receptacle having a pair of scavenging outlets which are located adjacent its fore and aft ends and which lead through communicating passages to said supply reservoir, a pair of scavenging pumps associated respectively with said outlets and said passages and adapted to either collectively or individually withdraw the used lubricant from said receptacle and deliver the same to said reservoir at all ordinary angles of inclination of the motor, the drainage receptacle and supply reservoir being otherwise closed to each other in order to prevent back flow from the reservoir to the receptacle, and force lubrication means adapted to feed lubricant from said supply reservoir to the motor bearings.

39. A lubricating system for motors comprising a drainage reservoir arranged to receive lubricant draining from the motor parts, said reservoir permitting free and unobstructed flow therein of the used lubricant in the fore and aft direction and from one end to the other, said drainage reservoir having longitudinally distributed scavenging outlets through which the used lubricant may be drained, and a scavenging and feeding system so arranged with respect to each of said outlets and forming a part of the lubricating system as to withdraw the used lubricant from said drainage reservoir, and thereby maintain the same substantially dry, at all ordinary angles of inclination of the motor assumed in practice.

40. A lubricating system for motors comprising a drainage reservoir arranged to receive lubricant draining from the motor parts, said reservoir permitting free and unobstructed flow therein of the used lubricant in the fore and aft direction and from one end to the other, said drainage reservoir having longitudinally distributed scavenging outlets through which the used lubricant may be drained, and a scavenging system so arranged with respect to each of said outlets and forming a part of tne lubricating system as to withdraw the used lubricant from said drainage reservoir, and thereby maintain the same substantially dry, at all ordinary angles of inclination of the motor assumed in practice, and means supplying the lubricant to the motor parts.

In testimony whereof I affix my signature in presence of two witnesses.

GLENN H. CURTISS.

Witnesses:
  G. R. HALL,
  H. C. GENUNG.